US005736007A

United States Patent [19]

Duffy

[11] Patent Number: 5,736,007
[45] Date of Patent: Apr. 7, 1998

[54] METHOD OF LIQUOR REMOVAL FROM PARTICULATE SOLIDS

[75] Inventor: Geoffrey Graeme Duffy, Auckland, New Zealand

[73] Assignee: Auckland UniServices Limited, Auckland, New Zealand

[21] Appl. No.: 397,265

[22] PCT Filed: Sep. 28, 1993

[86] PCT No.: PCT/NZ93/00088

§ 371 Date: Mar. 15, 1995

§ 102(e) Date: Mar. 15, 1995

[87] PCT Pub. No.: WO94/08088

PCT Pub. Date: Apr. 14, 1994

[30] Foreign Application Priority Data

Oct. 2, 1992 [NZ] New Zealand .............. 244599

[51] Int. Cl.$^6$ ............................ D21C 9/18
[52] U.S. Cl. ............... 162/53; 162/56; 162/60; 210/770; 210/771; 100/37; 100/90; 100/92; 34/305; 34/398; 34/403; 34/405
[58] Field of Search ............... 162/4, 6, 21, 56, 162/60, 53, 63, 65, 17, 18, 205–207, 353.1–353.5; 159/2.1, 2.2, 7–10, 13.1–13.3, 25.1; 210/808, 416.1, 770, 771, 400, 402; 34/305, 403, 402, 405, 412, 443, 487, 492, 191, 398; 100/70 R, 73, 74, 90, 92, 93 R, 93 P, 93 S, 37, 38

[56] References Cited

U.S. PATENT DOCUMENTS

| 643,891 | 1/1900 | Bussells ................. 100/74 |
| 675,179 | 5/1901 | Wacher .................. 100/74 |
| 847,676 | 3/1907 | Mackethan ............ 159/25.1 |
| 1,151,186 | 8/1915 | Johnson ................. 100/74 |
| 2,534,324 | 12/1950 | Von Hildebrandt ........ 162/68 |
| 2,696,148 | 12/1954 | Hornbostel .............. 100/90 |
| 2,999,785 | 9/1961 | Richter et al. ........... 162/60 |
| 3,127,367 | 3/1964 | Endres et al. ............ 159/7 |
| 3,447,451 | 6/1969 | Meskanen ............... 100/90 |
| 3,938,434 | 2/1976 | Cox ...................... 100/90 |
| 3,939,763 | 2/1976 | Sato ..................... 100/93 S |
| 3,943,033 | 3/1976 | Wallen ................... 162/232 |
| 4,324,613 | 4/1982 | Wahren .................. 162/375 |
| 4,975,204 | 12/1990 | Henricson et al. ........ 162/56 |
| 4,976,820 | 12/1990 | Laapotti ................. 162/206 |
| 5,071,513 | 12/1991 | Bluhm et al. ............ 162/206 |
| 5,186,791 | 2/1993 | Seifert et al. ........... 162/56 |

FOREIGN PATENT DOCUMENTS

| 200641 | 5/1955 | Australia . |
| 244077 | 10/1960 | Australia . |
| 0 148 382 | 7/1985 | European Pat. Off. . |
| 61-182899 | 8/1986 | Japan .................... 100/90 |
| 221311 | 9/1924 | United Kingdom . |

*Primary Examiner*—William H. Beisner
*Attorney, Agent, or Firm*—Young & Thompson

[57] ABSTRACT

Liquor removal from particulate solids such as wet wood pulp is achieved by applying a pneumatic or vapor pressure force through a pad of the wood pulp to compress the solids and to expel liquor from the solids. If air is used as a displacing medium, no wash liquor is added and the solids are simply compressed and some of the liquor is replaced by the gas passing through the suspension. If steam is used, not as a heating medium but as a pressure medium, an increase in liquor removal occurs over and above that removed by gas only due to the condensation of the steam to form a liquid front travelling before the steam through the solid suspension. Hence, in principle, a combination of pressure washing and displacement occurs resulting in a high efficiency in washing. Gas or steam could therefore simply be applied to any conventional operation to increase the washing efficiency both by compression and by displacement.

10 Claims, 10 Drawing Sheets

METHOD OF LIQUOR REMOVAL FROM PARTICULATE SOLIDS

TECHNICAL FIELD OF THE INVENTION

This invention relates to a new method of liquor removal and/or washing from suspensions of particulate solids. It has particular application to the dewatering of wood pulp fibres in the pulp and paper industries. Measurements are provided on the dewatering of bleached kraft fibre pads.

BACKGROUND OF THE INVENTION

A slurry is a suspension of solid particles in a liquid. There are many cases where the liquid is drained from the suspension to obtain the solids and in some cases some form of de-watering has to be carried out in order to remove the liquor trapped between the particulate solids. The two most commonly used methods are pressing and drying, both of which are expensive. Pressing requires robust machinery and drying requires some heating medium which is often expensive, for example, steam.

This invention applies to the improvement of such operations on two counts; (i) it provides a method of de-watering a solid porous medium structure without the application of high mechanical force, (ii) a method of removing the liquor trapped between the particles as well as a means of washing the liquor out of the porous medium. The method also has potential of particulate elutriation, namely the removing of some small particles from the interstices of the porous medium.

The most common methods of removing the liquor from a bed of solids is to provide a strong physical pressure by some form of mechanical compression, such as a ram, a rolling mechanical press for continuous operation, or forcing the solids through two rotating rolls and into the nip of those rolls to remove the liquor. Although some of the liquor is removed it does not provide a method of removing all the liquor and, generally speaking, further de-watering by drying action is needed.

There are other methods of course, such as centrifugation where large radial forces are used to remove the liquor from the solid as well as concentrating methods (such as a hydrocyclone) which increases the outlet concentration of the particulate suspension. However, in most cases where there is a soluble or contaminant component in the liquor which has to be removed, the particulate suspension or precipitate of solids has to be washed. The washing process can either be carried out by compression or by displacement. In displacement a liquor is either drawn through the suspending solids or forced through those solids to displace the contaminated liquor trapped in between the particulate solids.

In the pulp and paper industry the particulate solids are wood pulp fibres. In the chemical process the black liquor that is formed has to be removed by washing. In some cases simple compression or centrifugation is used but in most cases the wash water is added by forcing it through the pad of fibre suspension. This is usually carried out either on a continuous belt or on a rotating drum and the washed liquor is added to the pad and drawn through the pad, either by suction or by a mild positive force.

In mechanical pulping the conventional technique is to apply large hydraulic and physical pressures using rotating rolls or a screw type press. In some cases the pulp is mixed with water following one stage of the operation and then the liquor is squeezed out in a second stage. In this case it is impossible to arrive at a contaminate free liquor in the solids, although the quantity of liquor can be dramatically reduced as well as a lowering of the contaminant concentration.

OBJECT OF THE INVENTION

It is an object of this invention to provide an improved method of liquor removal and/or washing from suspensions of particulate solids, or one which will at least provide the industry with a useful choice.

SUMMARY OF THE INVENTION

This invention goes a long way to solving some of these problems because it does not necessarily require the addition of a clean wash liquor or wash water to the solids, although in some cases this may be advantageous. The principle is to apply either a pneumatic or vapour pressure force through suspension of solids in order to compress the solids to remove the initial liquor and/or to displace the liquor from the solids.

In one aspect the invention provides a method of removing liquor from particulate or fibrous solids such as wood pulp wherein a layer of wet particulate or fibrous material is provided on a porous substrate and pressure is applied to the layer to remove liquor therefrom characterised in that a pressurised displacing medium is applied to the layer of particulate or fibrous solids to remove liquor therefrom.

Preferably the displacing medium is a gas or vapour at a pressure in excess of 60 kPa.

The displacing medium may be air or steam at a pressure in the range from 60 kPa to 420 kPa.

More preferably the displacing medium is steam at a pressure of about 350 kPa.

Preferably the displacing medium is applied to the particulate or fibrous solids in pressurised pulses of short duration. Preferably the pressurised pulses are in the range of 0.2 to 1.2 seconds.

Preferably the steam is generated in situ by allowing the wet layer to contact a very hot surface.

In another aspect the invention provides apparatus for removing liquor from particulate or fibrous solids such as wood pulp wherein a layer of wet particulate or fibrous material is provided on a porous substrate and pressure is applied to the layer to remove liquor therefrom characterised in that a pressurised displacing medium is applied to the layer of particulate or fibrous solids to remove liquor therefrom.

Preferably the layer of wet particulate or fibrous material is moved through a confined space having an inlet and an outlet for said layer, an inlet for said displacing medium and an outlet for said liquor removed from said layer. This may take the form of a pad forming drum or other perforate wire machine (as in paper or pulp machines) or it may take the form of a hollow auger within a perforate chamber.

If air is used as a displacing medium, no wash liquor is added and the solids are simply compressed and some of the liquor is replaced by the gas passing through the suspension.

However, if steam is used, not as a heating medium but as a pressure medium, an increase in liquor removal occurs over and above that removed by gas only due to the condensation of the steam to form a liquid front travelling before the steam through the solid suspension. Hence, in principle, a combination of pressure washing and displacement occurs resulting in a high efficiency in washing. Gas or steam could therefore simply be applied to any conventional operation to increase the washing efficiency both by compression and by displacement.

This method could also be added to an existing compression washing apparatus so that the combined effect would be mechanical compression, hydraulic/pneumatic compression as well as displacement. In addition, it could well be possible that the rapid transfer of air or steam through the solid suspension will also remove small particulate solids (such as in the de-inking operation, or in the removal of fines from pulp suspensions) resulting in modified degree of elutriation.

A further option is to self-generate rapidly expanding vapour at the surface of the solid layer by in-situ generation of steam caused when the surface of the solid bed is contacted with a very hot surface. The vapour expanding through the porous medium drives out the liquor from the solids.

The gas/steam pressures involved are moderately low. The duration over which the pressure pulse has to be applied to the bed of solids is quite small and efficiency relates to the level of pressure and the time over which it is supplied.

Of course, the particle size and shape, as well as the distribution of particle size and shape which governs the porosity of the structure will also effect the displacement efficiency, the washing efficiency and the degree of solids compression. In the pulp and paper industry, the removal of liquor from a fibre suspension depends on several factors, including the nature of the fibres themselves, pad thickness, degree of fibrillation, the presence of fines or small fibrous elements, the temperature of the web etc. The optimum liquor removal and washing efficiency will depend on a combination of these effects.

There are numerous other cases to which this technique can be applied such as the washing of bleaching liquors from chemical pulp, the washing of soluble extractives from mechanical pulp, washing of casein etc.

BRIEF DESCRIPTION OF THE DRAWINGS

The invention will now be described by way of example with reference to the accompanying drawings, in which.

Figure 17:
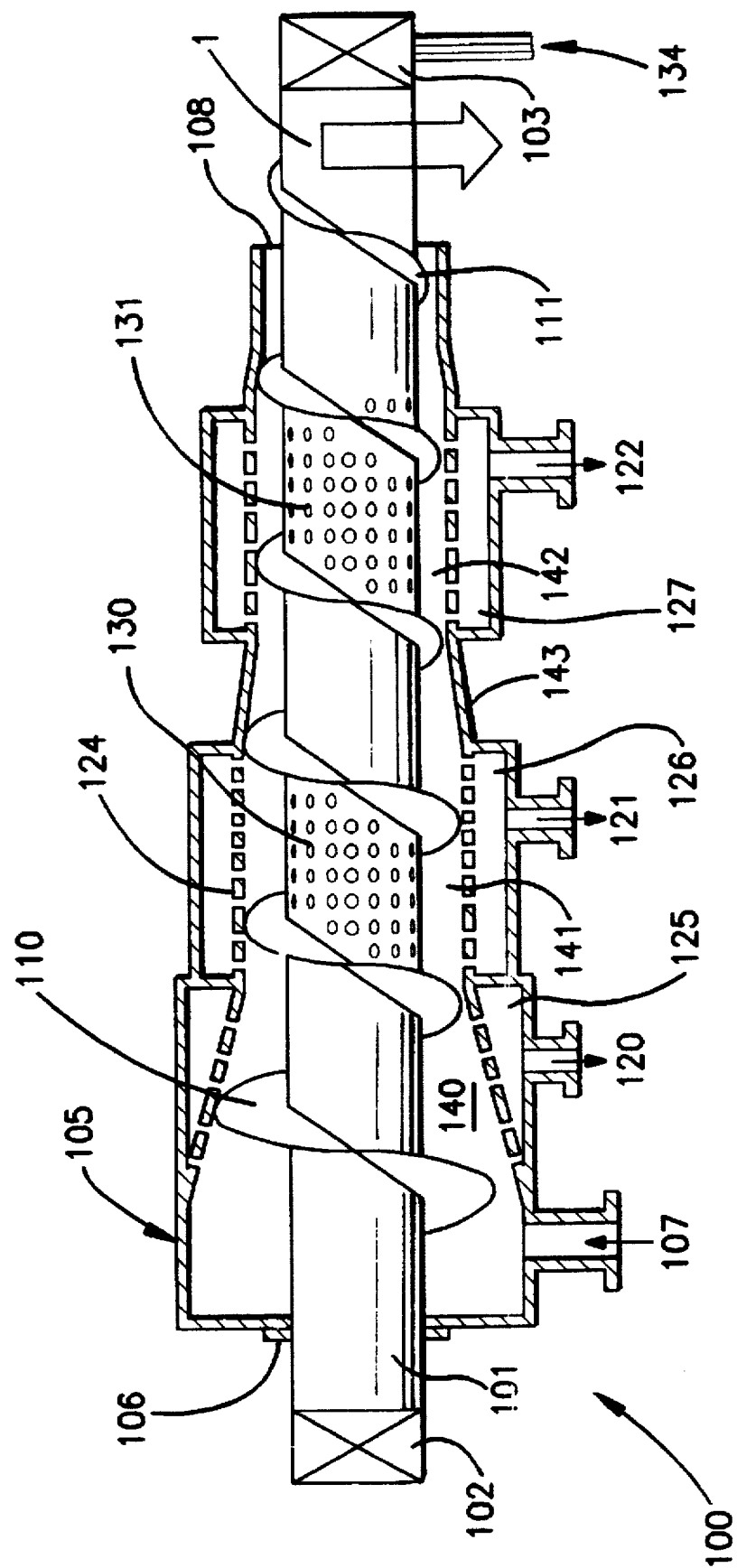

FIG. 17 is a schematic drawing of a multi-stage helical shaft liquor removal plant.

Figure 18:
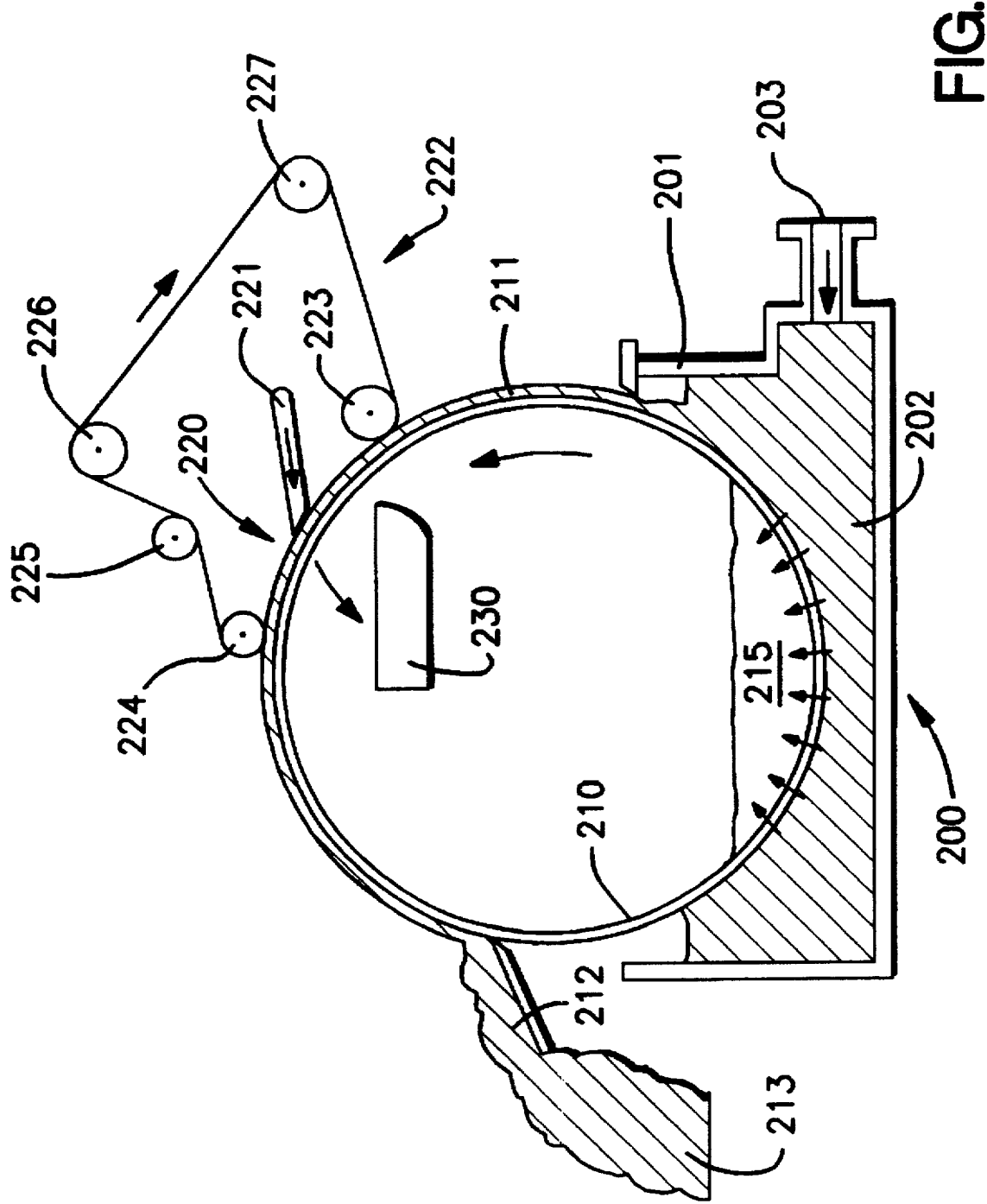

FIG. 18 is a schematic drawing of a vat forming pad, with an additional air or steam injector.

DESCRIPTION OF THE PREFERRED EMBODIMENT

Figure 1:
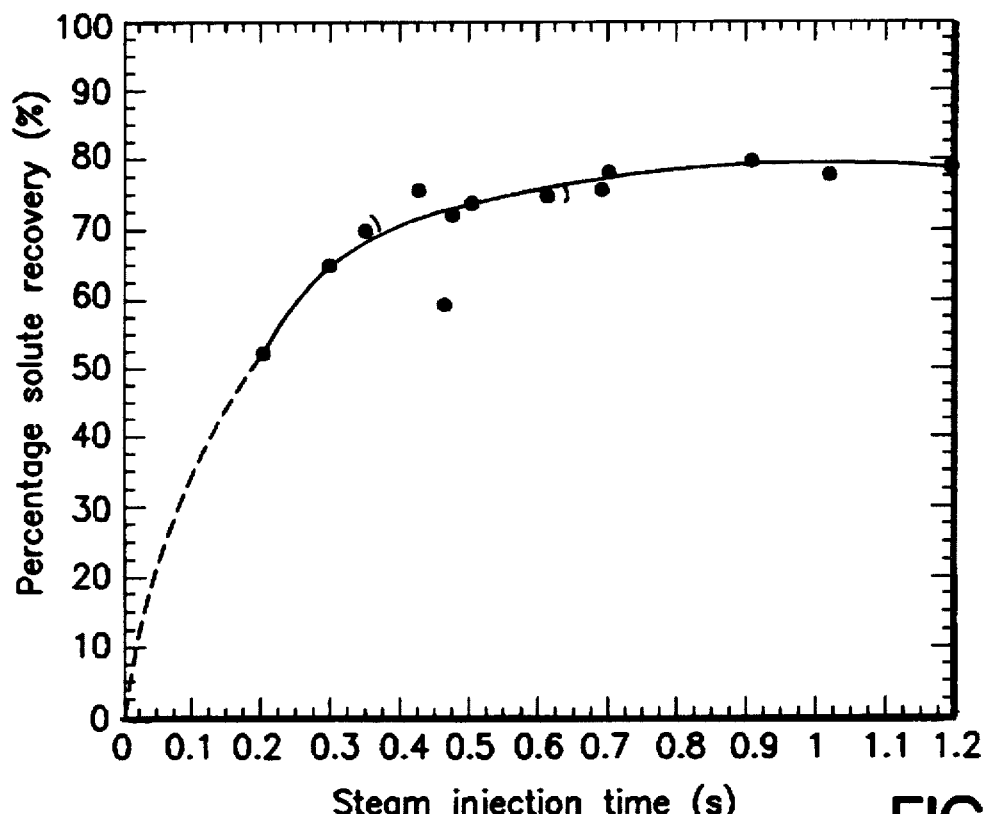
FIG. 1 is a graph illustrating the percentage solute recovery versus stem injection time for 80 mm diameter bleached kraft fibre pads (approximately 820 g/m$^2$ basis weight, 14.0 percent initial fibre consistency and 28,800 ppm black liquor sodium ion concentration) exposed to steam at 138 kPa.
Figure 2:
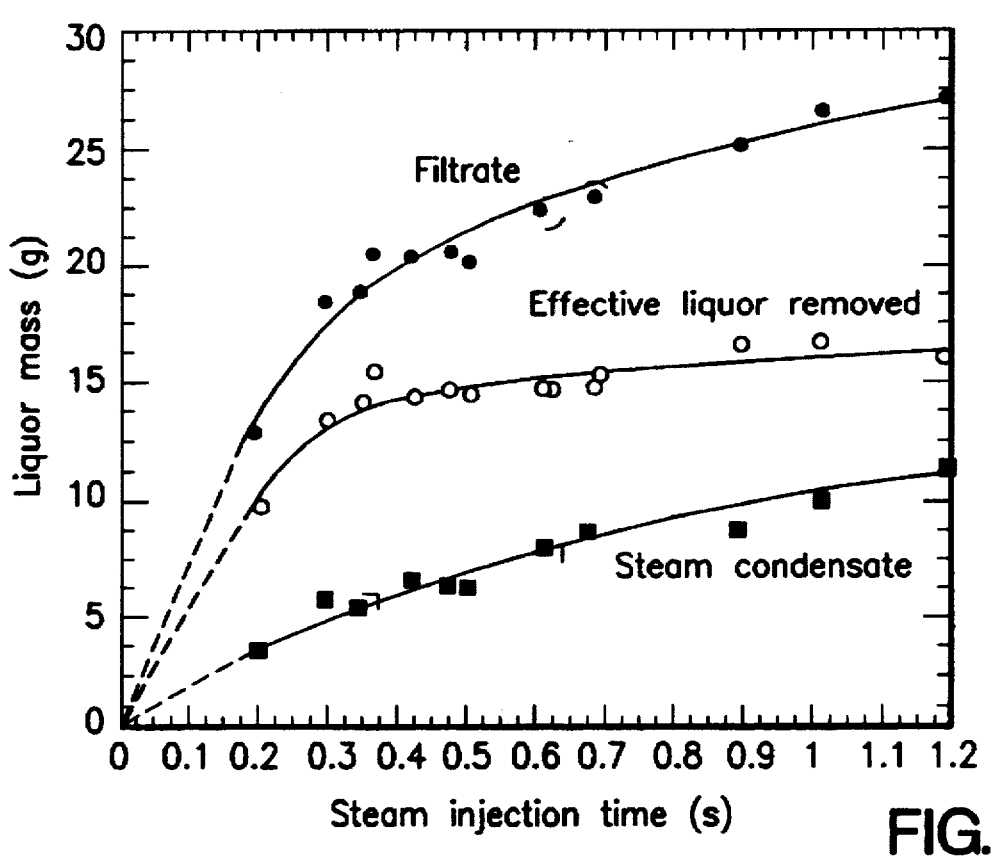
FIG. 2 is a graph illustrating the filtrate, steam condensate and effective liquor removed versus steam injection time for 80 mm diameter bleached kraft fibre pads (approximately 820 g/m$^2$ basis weight, 14.0 percent initial fibre consistency and 28,800 ppm initial black liquor sodium ion concentration) exposed to stem at 138 kPa.
Figure 3:
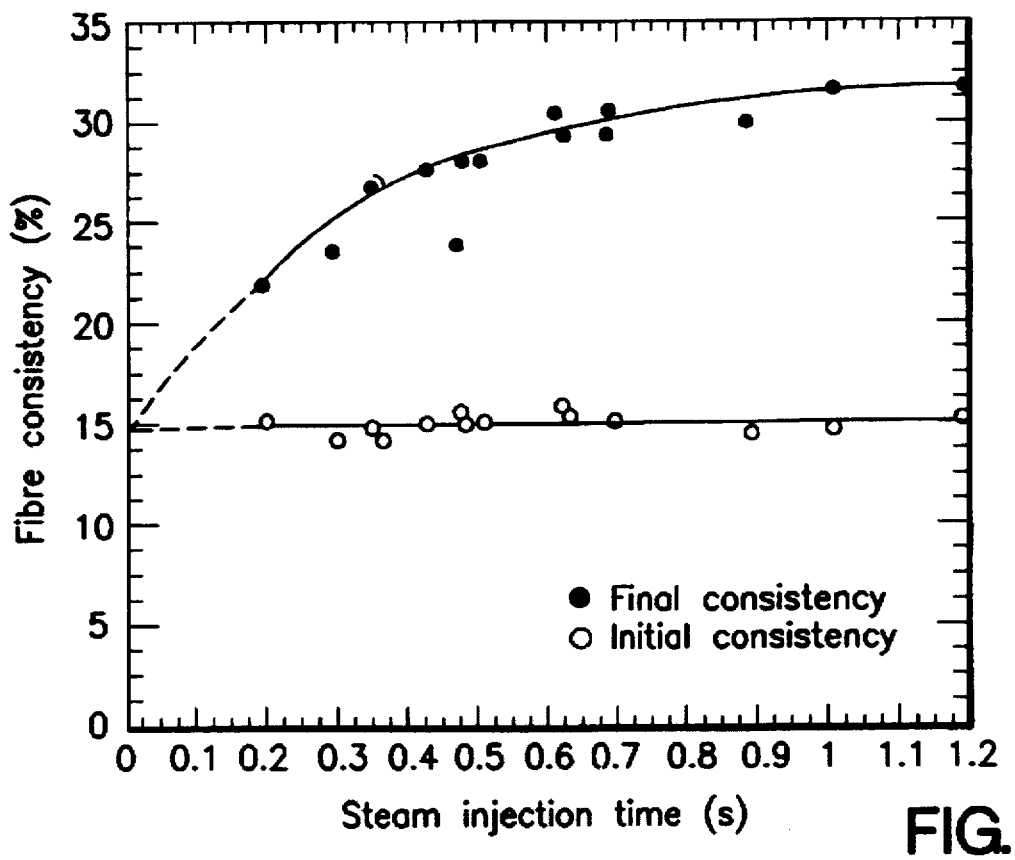
FIG. 3 is a graph illustrating the fibre consistency versus stem injection time for 80 mm diameter bleached kraft fibre pads (approximately 820 g/m$^2$ basis weight, 14.0 percent initial fibre consistency and 28,800 ppm initial black liquor sodium ion concentration) exposed to steam at 138 kPa.

A typical result for the percentage of recovery of black liquor from a kraft fibre suspension is given in FIG. 1 for a 14 percent initial fibre consistency sample, at a pad basis weight of 820 g/m², and a black liquor concentration of 28,800 ppm exposed to steam at 138 kPa. This shows that for this set of conditions the optimum injection time for steam is approximately 0.4 of a second. In the second diagram (FIG. 2) for the same conditions, the liquor mass is reported for the same steam injection times. In the FIG. 3 the effect of increasing the fibre consistency caused by the steam passing through the fibre suspension is also shown as a function of steam injection time.

Figure 4:
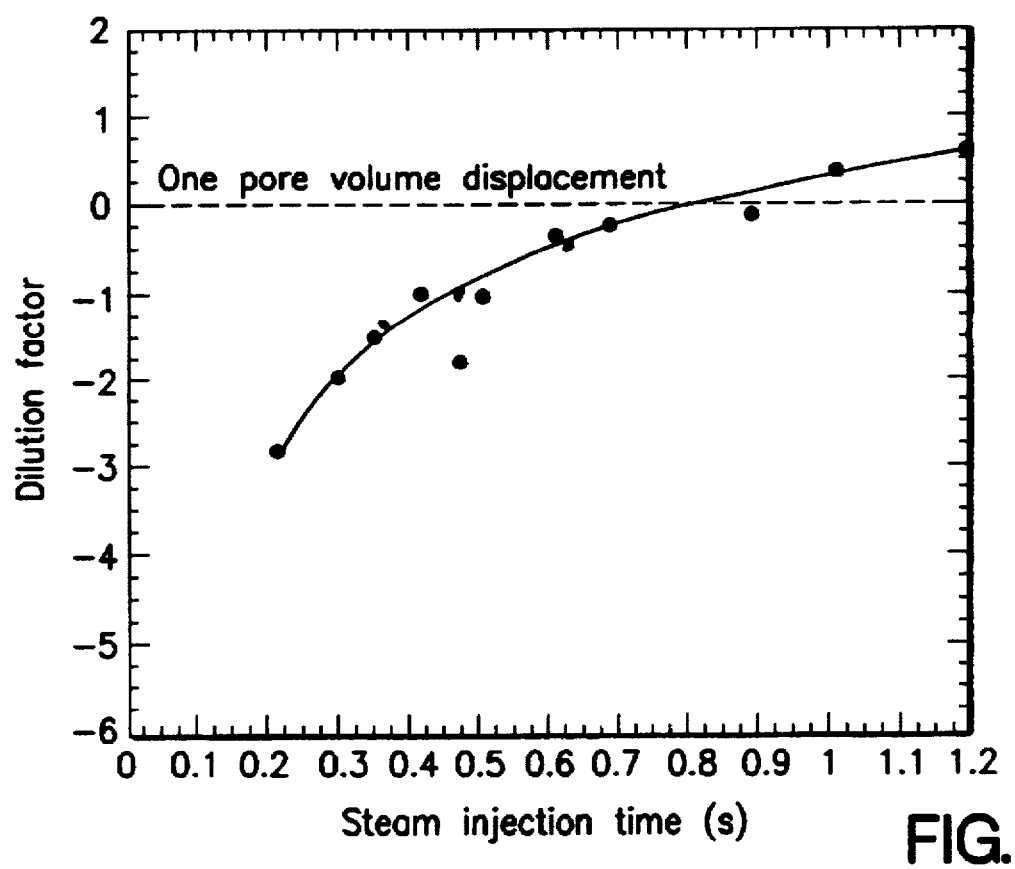
FIG. 4 is a graph illustrating the dilution factor versus steam injection time for 80 mm diameter bleached kraft fibre pads (approximately 820 g/m$^2$ basis weight, 14.0 percent initial fibre consistency and 28,800 ppm initial black liquor sodium ion concentration) exposed to steam at 138 kPa.

Because the fibre suspension is compressible, it undergoes both a displacement washing action as well as a compression washing action with fibre pad compression. To account for the outlet, fibre concentration being higher than the inlet consistency, the term "Dilution Factor" (which is the ratio of the wash liquor entering minus the wash liquor leaving the wash pulp per tonne of washed pulp) is used. The results for the same set of conditions described in FIGS. 1–3 above are presented in the FIG. 4 as dilution factor versus steam injection time. A zero dilution factor indicates one pore volume of liquor displaced from the fibre matrix.

Figure 5:
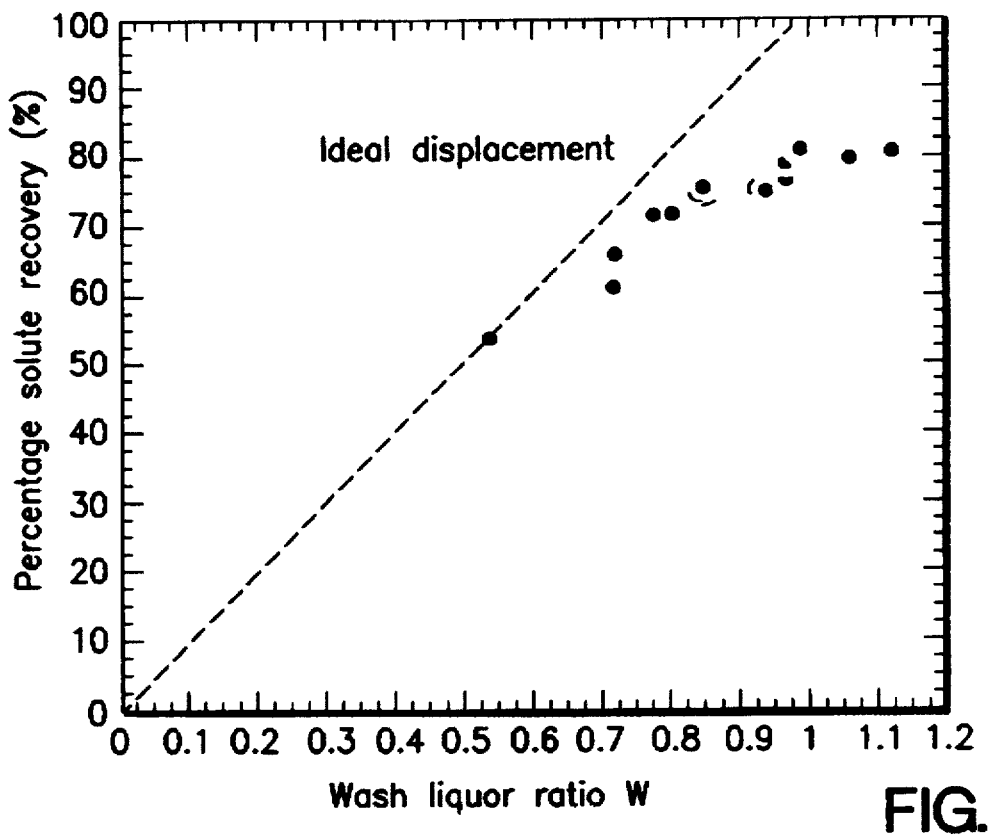
FIG. 5 is a graph illustrating the percentage solute recovery versus wash liquor ratio for 80 mm diameter bleached kraft fibre pads (approximately 820 g/m$^2$ basis weight, 14.0 percent initial fibre consistency and 28,800 ppm initial black liquor sodium ion concentration) exposed to steam at 138 kPa.

In the FIG. 5 the percentage of solute recovered is plotted against the washed liquor ratio which is defined as the filtrate liquor leaving over the liquor entering the pulp with the unwashed pulp.

Figure 6:
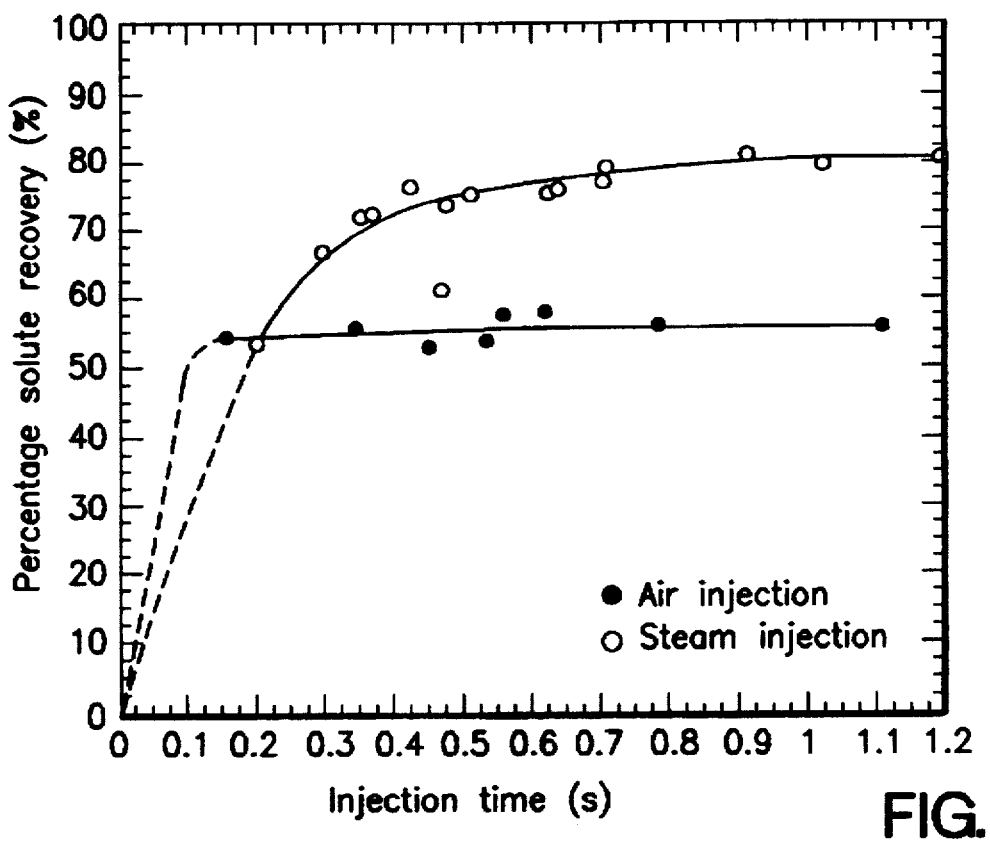
FIG. 6 is a graph illustrating the percentage solute recovery versus injection time for 80 mm diameter bleached kraft fibre pads (approximately 820 g/m$^2$ basis weight, 14.0 percent initial fibre consistency and 28,800 ppm initial black liquor sodium ion concentration). Comparison between steam injection and air injection at 138 kPa.
Figure 7:
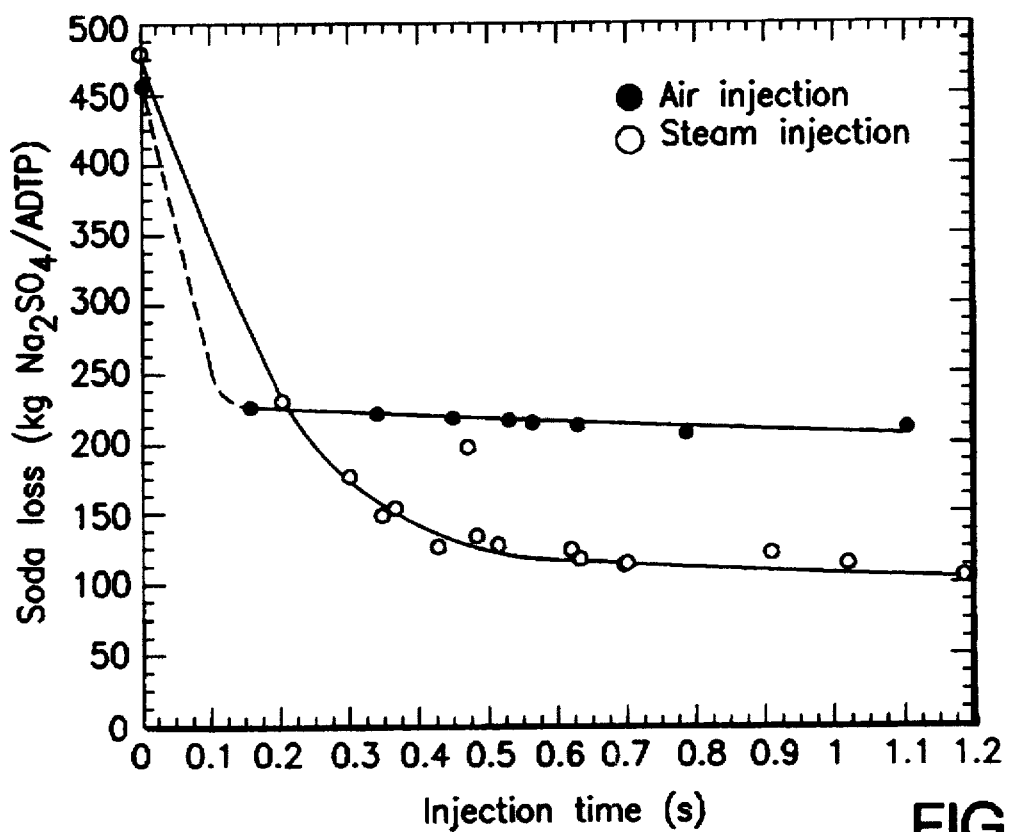
FIG. 7 is a graph illustrating the soda loss versus injection time for 80 mm diameter bleached kraft fibre pads (approximately 820 g/m$^2$ basis weight, 14.0 percent initial fibre consistency and 28,800 ppm initial black liquor sodium ion concentration). Comparison between steam injection and air injection at 138 kPa.
Figure 8:
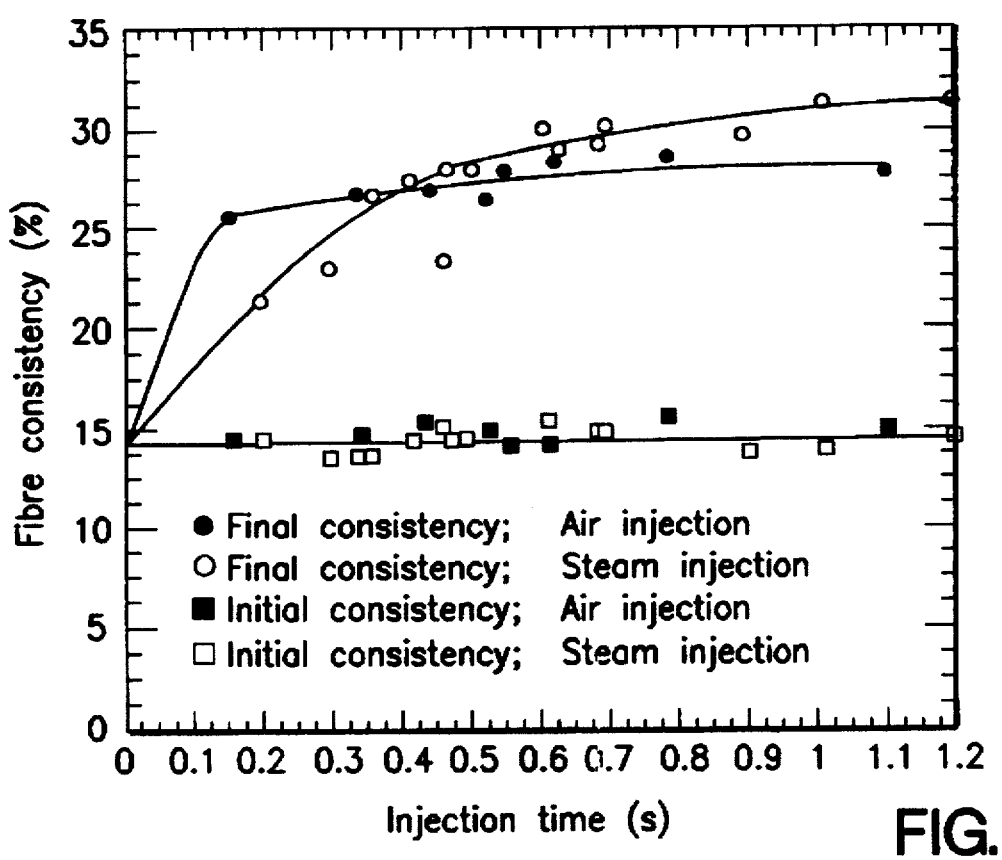
FIG. 8 is a graph illustrating the fibre consistency versus injection time for 80 mm diameter bleached kraft fibre pads (approximately 820 g/m$^2$ basis weight, 14.0 percent initial fibre consistency and 28,800 ppm initial black liquor sodium ion concentration). Comparison between steam injection and air injection at 138 kPa.
Figure 9:
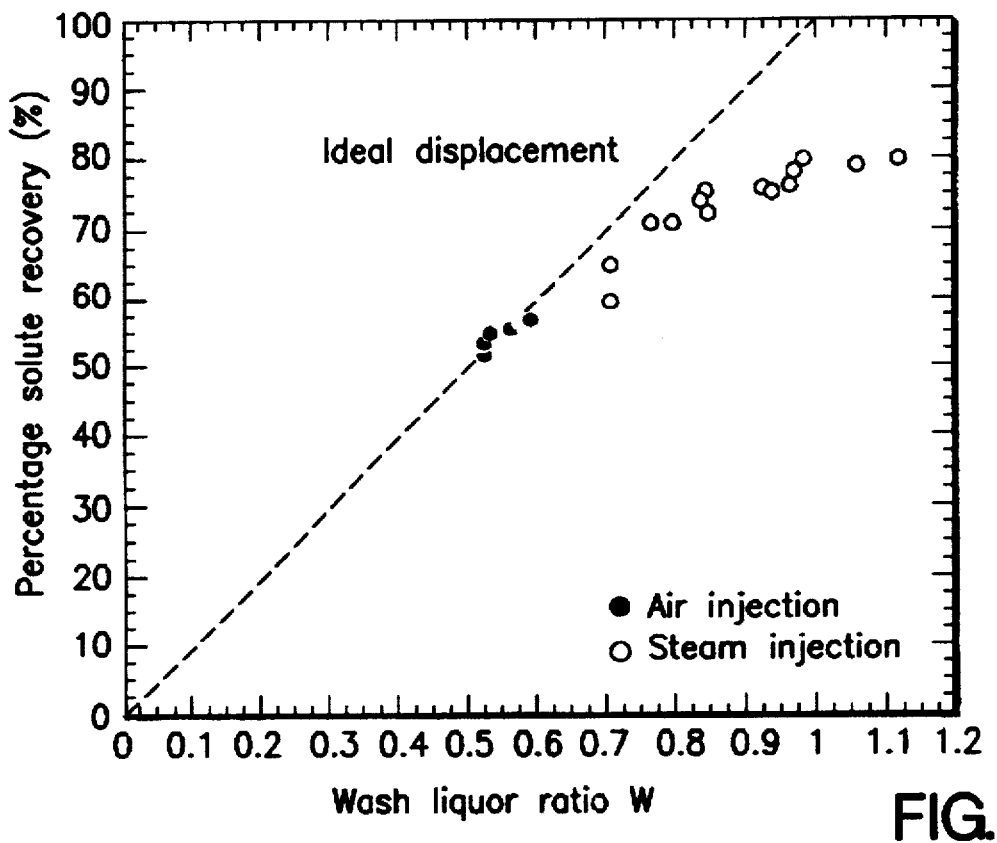
FIG. 9 is a graph illustrating the percentage solute recovery versus wash liquor ratio for 80 mm diameter bleached kraft fibre pads (approximately 820 g/m$^2$ basis weight, 14.0 percent initial fibre consistency and 28,800 ppm initial black liquor sodium ion concentration). Comparison between steam injection and air injection at 138 kPa.

In the next figure, FIG. 6, a comparison is made between the percentage solute recovery using air and steam for the same conditions as in FIG. 1. It is shown that steam is superior to air although there are other considerations to take into effect for the overall efficiency. In FIG. 7, the soda loss is reported against injection time to compare the two methods. In FIG. 8, a comparison is made between the fibre consistency increase for both methods and in FIG. 9 the solute recovery and the wash liquor ratio for both methods.

Figure 10:
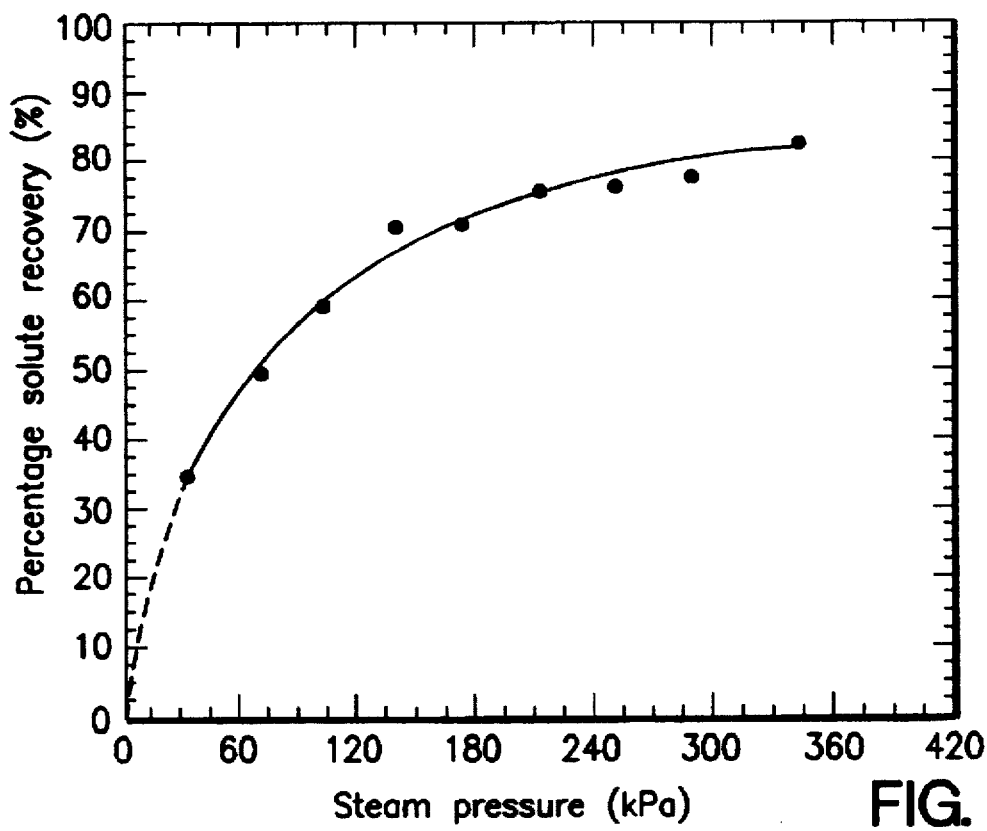
FIG. 10 is a graph illustrating the percentage solute recovery versus steam pressure for 80 mm diameter bleached kraft fibre pads (approximately 820 g/m$^2$ basis weight, 14.0 percent initial fibre consistency and 29,000 ppm initial black liquor sodium ion concentration) exposed to steam for 0.50 seconds.
Figure 11:
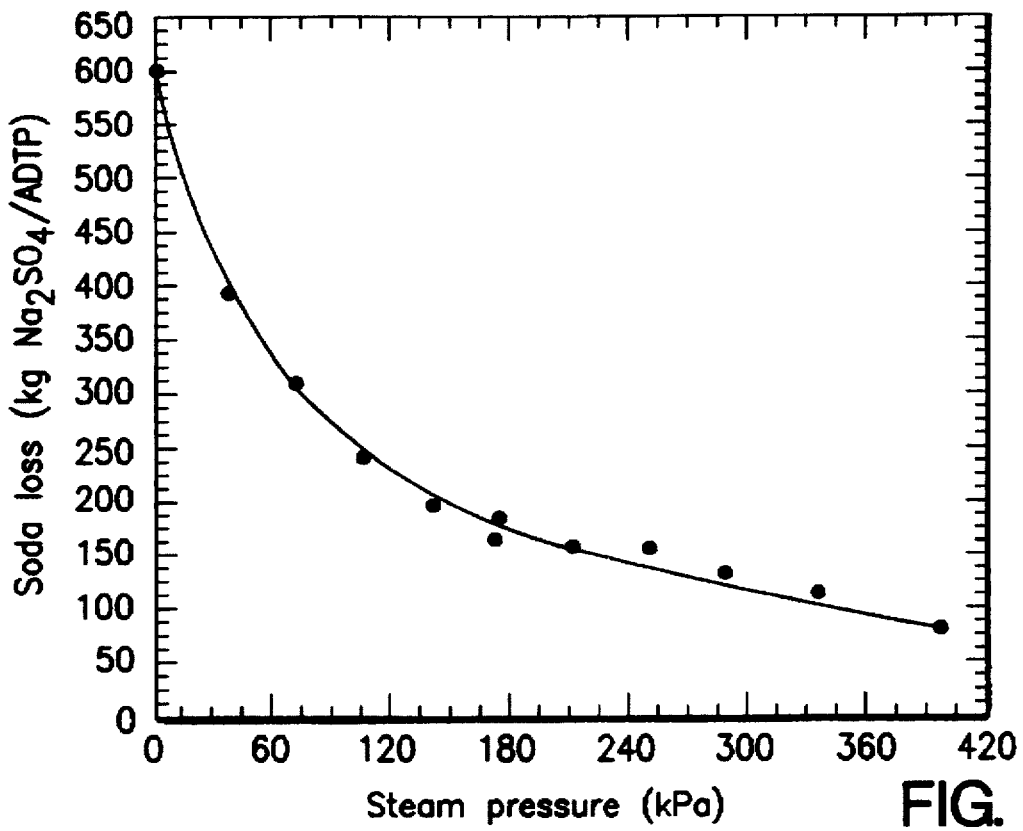
FIG. 11 is a graph illustrating the soda loss versus steam pressure for 80 mm diameter bleached kraft fibre pads (approximately 820 g/m$^2$ basis weight, 14.0 percent initial fibre consistency and 29,000 ppm initial black liquor sodium ion concentration) exposed to steam for 0.50 seconds.

FIGS. 10 and 11 show the effect of increasing steam pressure on the percentage solute recovery, for basically the same conditions as described in FIG. 1 for a 0.5 second pulse of steam. It can be seen that a washing efficiency greater than 80% can be obtained at approximately 350 kPa.

Figure 12:
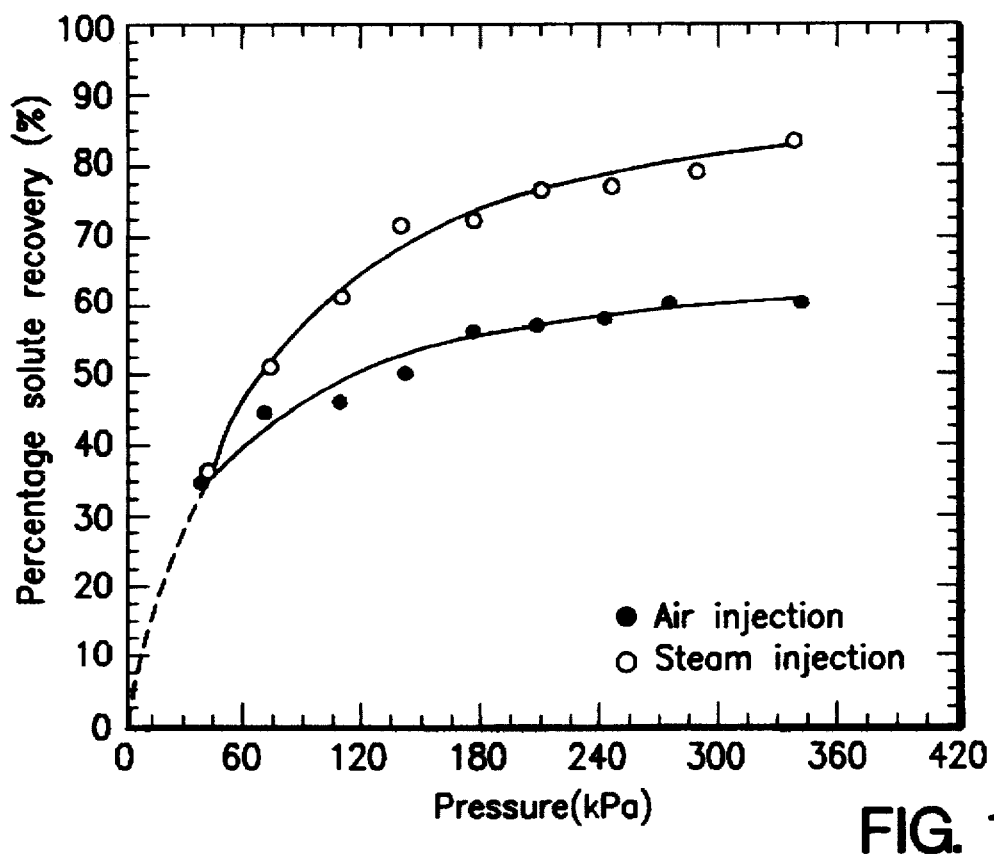
FIG. 12 is a graph illustrating the percentage solute recovery versus pressure for 80 mm diameter bleached kraft fibre pads (approximately 820 g/m$^2$ basis weight, 14.0 percent initial fibre consistency and 29,000 ppm initial black liquor sodium ion concentration). Comparison on and air injection for an injection time of 0.50 seconds.
Figure 13:
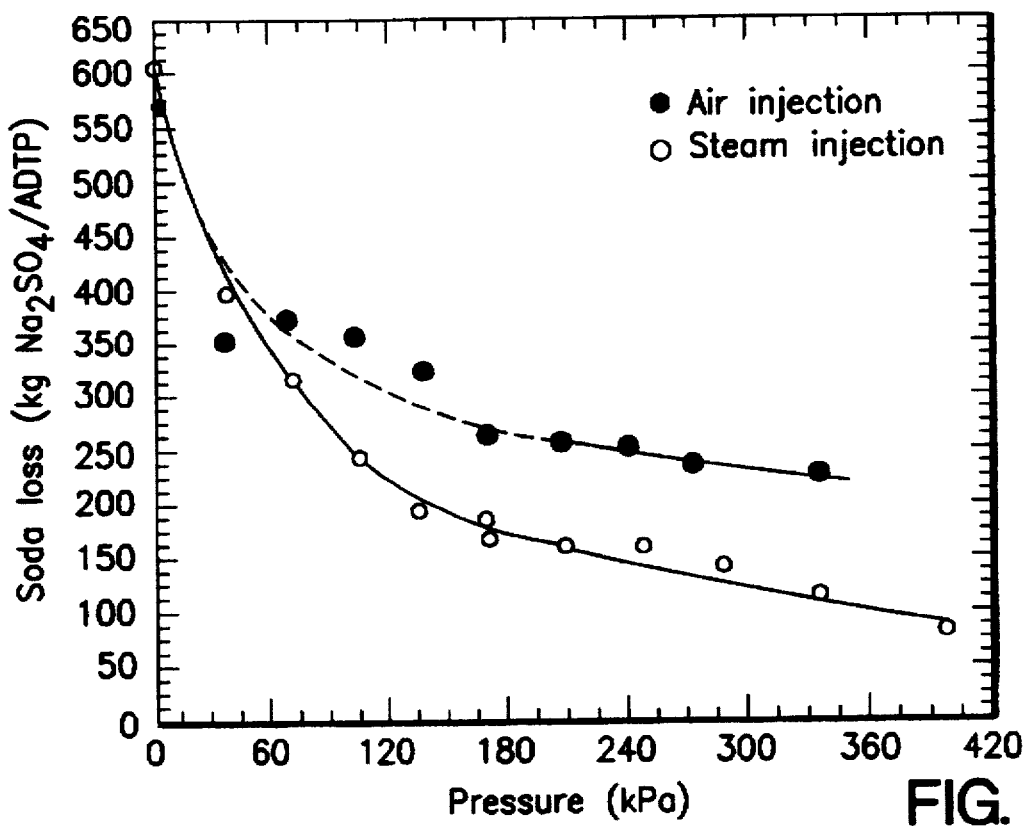
FIG. 13 is a graph illustrating the soda loss versus pressure for 80 mm diameter bleached kraft fibre pads (approximately 820 g/m$^2$ basis weight, 14.0 percent initial fibre consistency and 29,000 ppm initial black liquor sodium ion concentration). Comparison between steam injection and air injection for an injection time of 0.50 seconds.

In FIGS. 12 and 13 the same results are compared with those for air to show the solute recovery as a function of absolute pressure for 0.5 second duration of air injection.

Figure 14:
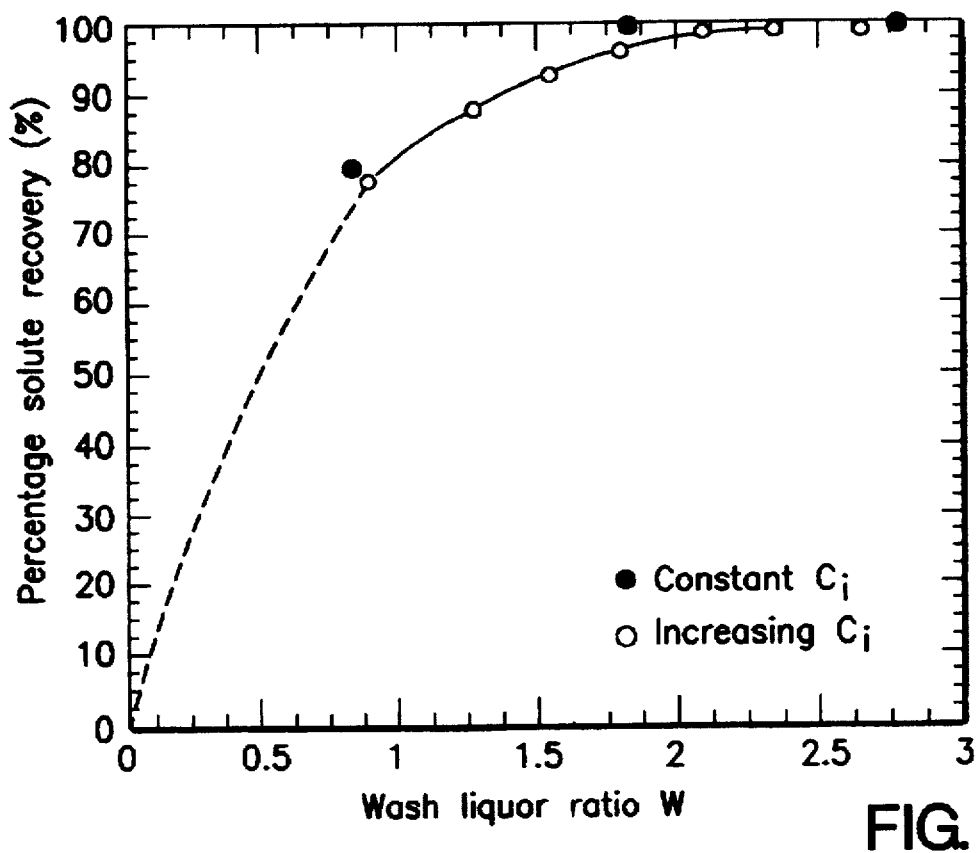
FIG. 14 is a graph illustrating the percentage solute recovery versus wash liquor ratio for 80 mm diameter bleached kraft fibre pads (approximately 820 g/m$^2$ basis weight, 13.6 percent initial fibre consistency and 30,400 ppm initial black liquor sodium ion concentration) exposed to stem at 133 kPa for 0.57 seconds.
Figure 15:
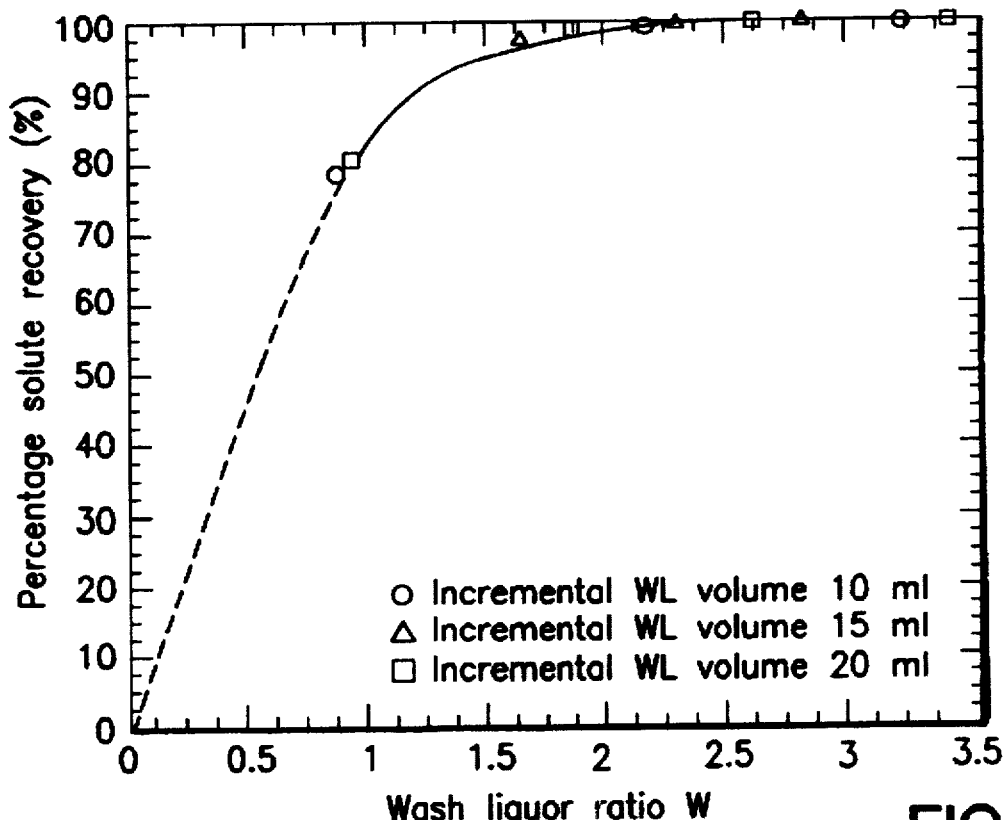
FIG. 15 is a graph illustrating the percentage solute recovery versus wash liquor ratio for 80 mm diameter bleached kraft fibre pads (approximately 820 g/m$^2$ basis weight, 13.6 percent initial fibre consistency and 30,400 ppm initial black liquor sodium ion concentration) exposed to stem at 133 kPa for 0.57 seconds.

FIG. 14 shows how a multi-stage operation can increase the efficiency to obtain 100% recovery of the solute. The conditions are similar to those described in FIG. 1 and the steam injection period is 0.57 of a second. However, the results are produced by interstage addition of water With subsequent injection of steam. They do not necessarily represent the optimum condition. The next figure, FIG. 15, however, shows that the percentage solute recovery is almost 100% at a wash liquor ratio of approximately 2.5.

Figure 16:
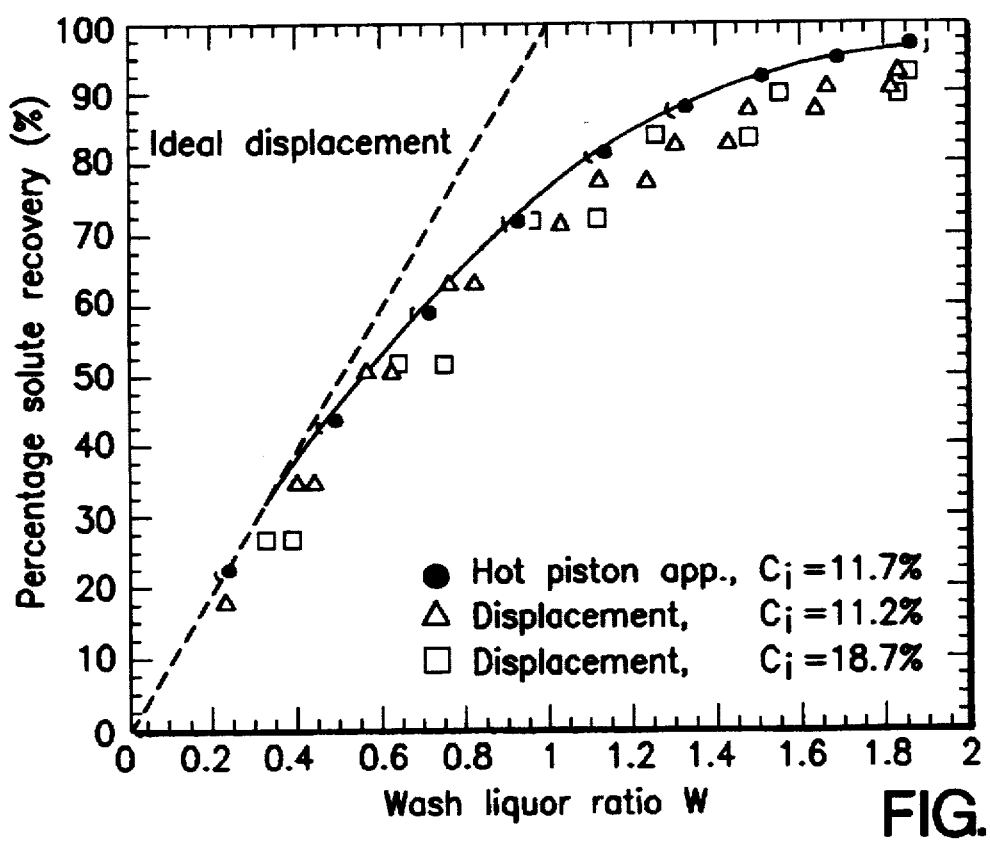
FIG. 16 is a graph illustrating the percentage solute recovery versus wash liquor ratio for 80 mm diameter bleached kraft fibre pads (approximately 2,500 g/m$^2$ basis weight, 11.7 percent initial fibre consistency and 16,400 to 18,100 ppm initial black liquor sodium ion concentration) contacted for 0.6 seconds with a piston of 5.0 kg mass (10 kPa static pressure). Comparison between conventional displacement washing at 11.2 and 18.7 percent fibre consistencies and vapour-phase pressure washing (in-situ steam generation).

Steam vapour can be generated at the surface of the porous medium by bringing it into contact with a high temperature surface. The percentage solute recovery versus wash liquor ratio for a piston operating at approximately 260° C. in FIG. 16. This indicates that it is possible to generate the steam in-situ rather than apply externally generated steam to the system.

These data illustrate how gas or steam can be used to compress, pressurise and wash fibre suspensions. They serve to illustrate the potential of this method but are in no way limiting the application of this technique. It can be shown that if the thickness of the bed of solids is increased so must be the steam pressure to get the same washing efficiency. Hence, there is a relationship between pad thickness, injection time and steam or gas pressure to get the optimum washing efficiency.

The invention can be applied as a single stage or multi-stage washing process. It will be noted that the results shown in FIG. 1 are derived from a single stage injection of steam, whereas those derived in FIG. 14, is a multi-stage operation, involving the interstage addition of water with subsequent injection of steam.

Laboratory experiments suggest that displacement efficiency will generally increase, for the following conditions:

(a) increasing fibre length to diameter ratio, (b) increasing pore volume (regardless of the packing array), (c) increasing basis weight, (d) increasing consistency (constant pad thickness), (e) decreasing wash liquor temperature (high initial black liquor sodium ion concentration), (f) adding small quantities of high molecular weight polymers to the wash liquor (different polymers behaved differently mechanistically), (g) reversing the fluid flow direction, (h) pulsing the fluid flow, and (i) applying low consistency compression washing in the early stages of washing.

Displacement efficiency was also increased slightly with decreasing black liquor sodium ion concentration. However, the increase was insufficient to increase the overall washing efficiency when a fraction of the total wash liquor was used to dilute the black liquor prior to pad formation.

Orientation of the fibres in a direction longitudinal to the flow of fluid though the pad, and vibration and compression of the pad during wash liquor application, acted to decrease the displacement efficiency. Displacement efficiency also decreased with increasing acid concentration of the wash liquor and increasing flow reversal volume.

Displacement efficiency was relatively independent of formation consistency up to the maximum experimental consistency of 1.2 percent, and of wash liquor flow rates greater than approximately 3 ml/s (1.8 l/min) corresponding to a superficial velocity of 0.06 cm/s. Little difference between two-stage washing operations with and without interstage remixing of the pulp was also found.

The preliminary investigation of steam pressure was limited to a range of pressures associated with low quality steam, in an attempt to utilise a cheap, readily available steam source. However, the results of the preliminary investigation suggest that it could be beneficial to use higher pressure stem, the cost of which could be recovered by an increase in the overall washing efficiency.

The vapour-phase pressure washing of this invention can be applied to other materials and other operations, for example:

(i) in dewatering or pressing,
(ii) in deinking waste paper pulps,
(iii) in bleaching,
(iv) in washing or dewatering mechanical pulps, and
(v) in washing or dewatering materials other than wood pulp, eg casein curd.

Liquor removal in accordance with this invention can be carried out using any plant adapted to expel liquor from pulp. Examples are shown in FIGS. 17 and 18, although other equipment can be used, and these drawings are merely examples illustrating the principle of this invention.

FIG. 17

In this embodiment, paper pulp is passed through a drying machine containing an auger 101 in a housing 105. The auger has a hollow shaft 101 mounted on bearings 102 and 103 and rotatably driven by a motor (not shown). The hollow shaft 101 passes through an aperture in the housing 105, there being a seal 106 about the aperture. The housing has a larger internal diameter at the inlet portion 107 than at that the outlet end 108. The auger 101 preferably has larger diameter flights 110 at the inlet portion, with the flights reducing in diameter towards the outlet end 108 so that the helical flights of the auger are of much smaller dimensions at the outlet end, eg that portion of the flights marked 111 are of smaller external diameter than the inlet portion of the helical flight 110. The housing 105 is sealed from the atmosphere, and has a pulp inlet 107 and a series of liquor outlets 120, 121, 122 and an outlet 108 for the clean pulp/solids.

Within the housing 105 there is a perforate wall 124 surrounding the flights 110-111, so that liquor expelled by the auger can be collected in the chambers 125, 126, 127 surrounding the auger.

Portions of the hollow shaft 101 of the auger corresponding to chambers 126 and 127 are provided with a plurality of perforations 130, 131. An air or steam injector pipe 134 is provided, conveniently at the outlet end of the auger, so that air or steam under pressure can be injected into the interior of the hollow shaft 101.

In use, pulp, typically paper pulp, of a 2-6% suspension enters the inlet 107, and is compressed and thickened by the rotation of the auger, within a first chamber 140 (that portion between the inlet 107 and the chamber 125). The auger rotates continuously, so that pulp is thickened and conveyed along the length of the auger. At the same time air or steam under pressure is injected via pipe 134 into the hollow interior of the shaft 101, and this escapes via the perforations 131 and 130 into chambers 142 and 141 respectively. These chambers are defined by the positioning of the auger flights and the perforate side walls 124. The temperature and pressure of the steam, and the duration of the pressure applied can be varied by the operator in accordance with the directions contained with reference to FIGS. 1-16.

As the pulp is thickened and compressed in chamber 140 some of the liquor is expelled via chamber 125 via outlet 120. Further dewatering occurs in chamber 141 as the steam or air under pressure acts as a displacing medium to expel liquor from the pulp in chamber 141 and force that liquor into chamber 126, and hence out via outlet 121. The pulp undergoes a further compressing and thickening stage as the external diameter of the housing reduces at section 143, and further displacement of liquor occurs in chamber 142 as steam or air under pressure escapes via perforations 131 into this chamber and displaces liquor into chamber 127 and out via outlet 122. The housing reduces in diameter again, so that further thickening and compression can occur as the essentially clean pulp/solids are expelled 108.

In this example only two displacing chambers have been shown, but it will be appreciated that any number of stages can be used depending upon the flow rates, and the size of the plant, and the thickness of the initial pulp.

FIG. 18

FIG. 18 shows a vat forming pad 200 having a bath 201 containing a dilute pulp suspension 202. There is an inlet 203 to this bath, so that dilute pulp suspension can be continuously added to the bath as the pulp is removed by the drum 210. The drum 210 is a wire covered drum which rotates counter-clockwise (as shown in FIG. 18) and collects pulp on its surface as it rotates through the bath. This surface coating of the pulp is labelled 211, and is removed from the drum 210 by a doctor knife 212 at the far side of the drum so that clean pulp 213 is collected outside of the bath 201.

Preferably a pressure differential exists between the outside of the drum 210 and the interior so that liquor 215 is sucked from the bath into the interior of the drum, and pulp is sucked onto the surface of the drum. This is conveniently achieved by applying a vacuum pump to the interior of the wire covered drum 210 so that some liquor is sucked into the interior, and pulp is poured onto the exterior of the drum.

A displacement medium is applied to the pulp 211 at region 220 by means of an air or steam injector 221. A moving wire band 222 is pressed against the surface of the pulp 211 by means of a series of rollers 223, 224, 225,226, 227 and held within side plates (not shown) so that a pressure differential exists between zone 220, and the interior of the drum 210. The air or steam can be applied in bursts, and at pressures or temperatures as outlined in the description with reference to FIGS. 1-16. By applying this displacement medium, additional dewatering can occur as the liquor in the wet pulp 211 is displaced through the wire drum into a separate liquor collector 230. The moving wire band 222 can also be used to apply some degree of pressure to the pulp on the surface, although this is less important than the application of the displacement medium (air or steam) as described above.

Variations

In both FIGS. 17 and 18, if steam is used in place of air as the displacement medium, the steam will expel liquor from the pulp, and will also wash the pulp, as some of the steam will condense within the pulp, forming a liquid front which travels before the steam through the solid suspension. Consequently a combination of pressure washing and displacement occurs, resulting in a high efficiency in washing. Although not shown in FIG. 17, the interior of the auger could be heated, so that as the wet pulp contacts the heated portion or portions of the auger, the moisture within the pulp is flashed to steam, and that steam then drives the remaining liquor from the pulp.

Finally, various other alterations or modifications may be made to the foregoing without departing from the scope of this invention.

I claim:

1. A method of removing liquor from pulp which comprises providing a layer of wet pulp on a porous substrate, applying a first pressure differential to the layer of pulp to remove liquor therefrom via said porous substrate, said first pressure differential comprising mechanical pressure applied by progressively forcing the pulp into smaller and smaller volumes, and applying a second pressure differential to the layer of pulp to remove liquor therefrom via said porous substrate; and wherein the second pressure differential comprises the application of a pressurized gas selected from the group consisting of air and steam to the layer of pulp in pressurized pulses of less than 1.2 seconds in duration, and at a pressure ranging from 60 kPa to 420 kPa.

2. A method of removing liquor from pulp as claimed in claim 1, wherein the pressurized gas is air.

3. A method of removing liquor from pulp as claimed in claim 1, wherein the pressurized gas is steam at a pressure of about 350 kPa.

4. A method of removing liquor from pulp as claimed in claim 1, wherein the duration of the pressurized pulses are in the range of 0.2 to 1.2 seconds.

5. A method of removing liquor from pulp as claimed in claim 3, wherein the steam is generated in situ by allowing the layer of pulp to contact a surface which is hot enough to cause moisture in the pulp to be converted to steam.

6. A method of removing liquor from pulp which comprises providing a layer of wet pulp on a porous substrate, applying a first pressure differential to the layer of pulp to remove liquor therefrom via said porous substrate, said first pressure differential comprising a vacuum applied to one side of the porous substrate, and applying a second pressure differential to the layer of pulp to remove liquor therefrom via said porous substrate; and wherein the second pressure differential comprises the application of a pressurized gas selected from the group consisting of air and steam to the layer of pulp in pressurized pulses of less than 1.2 seconds in duration, and at a pressure ranging from 60 kPa to 420 kPa.

7. A method of removing liquor from pulp as claimed in claim 6, wherein the pressurized gas is air.

8. A method of removing liquor from pulp as claimed in claim 6, wherein the pressurized gas is steam at a pressure of about 350 kPa.

9. A method of removing liquor from pulp as claimed in claim 8, wherein the steam is generated in situ by allowing the layer of pulp to contact a surface which is hot enough to cause moisture in the pulp to be converted to steam.

10. A method of removing liquor from pulp as claimed in claim 6, wherein the duration of the pressurized pulses are in the range of 0.2 to 1.2 seconds.

* * * * *